UNITED STATES PATENT OFFICE.

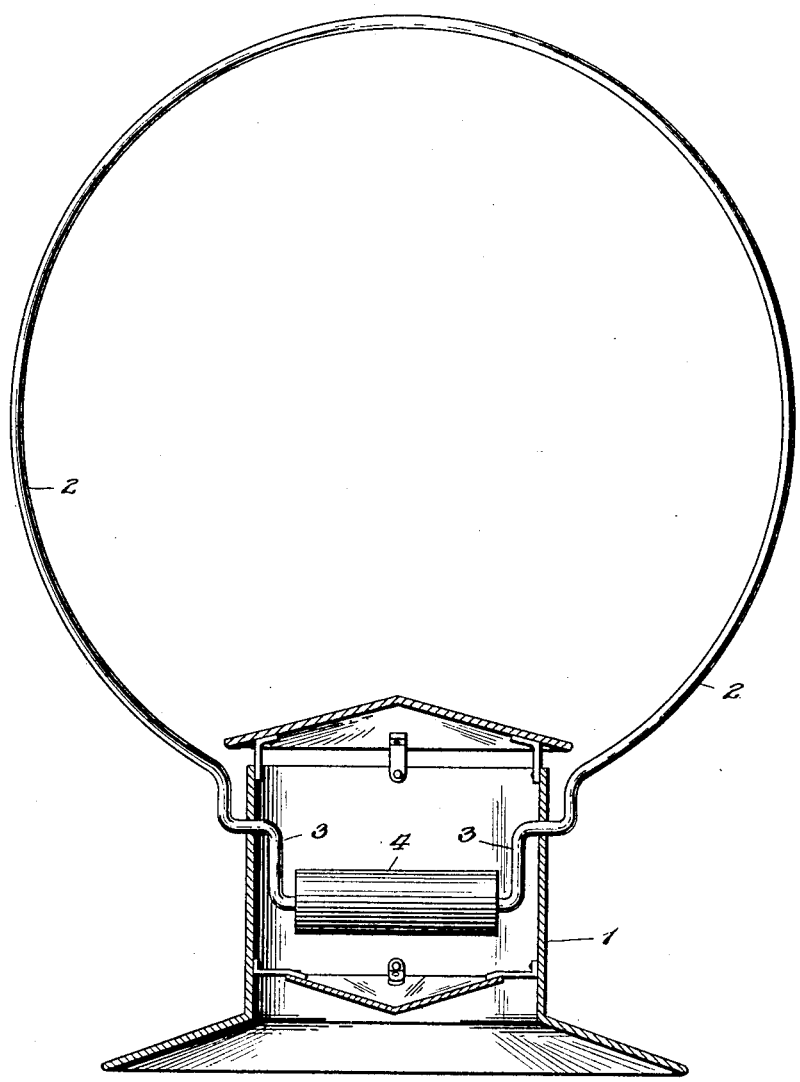

OLIN ELDRED KREBBS, OF SANTA ANA, CALIFORNIA.

LANTERN.

No. 906,536.  Specification of Letters Patent.  Patented Dec. 15, 1908.

Application filed September 3, 1908. Serial No. 451,559.

*To all whom it may concern:*

Be it known that I, OLIN E. KREBBS, citizen of the United States, residing at Santa Ana, in the county of Orange and State of California, have invented certain new and useful Improvements in Lanterns, of which the following is a specification.

This invention relates to lanterns, and has for its object to provide simple and efficient means for maintaining the handle of a lantern in vertical position, in which position it can be readily grasped at all times. This object is accomplished by means of the devices hereinafter described and illustrated in the accompanying drawings.

The drawing is a sectional view showing the handle applied to a lantern.

Referring specifically to the drawings, 1 indicates the dome of an ordinary lantern, the details of which are immaterial to the present invention. The ends of the ring handle 2 extend through holes in opposite sides of the dome, and within the dome are bent or cranked downwardly, as indicated at 3, and fastened in or to a weight 4, conveniently made of lead and extending across and connecting the ends of the handle ring. The weight is preferably made of lead, in or to which the ends of the ring can be soldered or otherwise fixed. The weight hangs below the pivotal point of the handle, and accordingly the handle will normally be maintained in upright position, but nevertheless can be swung to either side, as usual.

The simplicity of the device is obvious, and no manipulation is required to keep the handle in upright position, as with catches and other devices which have been proposed for the same purpose.

I claim:

1. The combination with a lantern, of a freely swinging bail having ends extending through pivot holes in opposite sides of the dome of the lantern, and a weight located within the dome and attached to the bail below the pivotal point, and acting to hold the bail in normally upright position and permitting free swing of the bail.

2. The combination with a lantern, of a freely swinging bail having ends extending through pivotal holes in opposite sides of the dome of the lantern, said ends being cranked downwardly within the dome, and a weight fastened to the said ends, to hold the bail in upright position and permitting free swing of the bail.

In testimony whereof, I affix my signature in presence of two witnesses.

OLIN ELDRED KREBBS.

Witnesses:
J. N. TRUDEAU,
K. H. STEVENS.